(12) United States Patent
Hirunuma et al.

(10) Patent No.: US 6,252,713 B1
(45) Date of Patent: Jun. 26, 2001

(54) OPTICAL DEVICE PROVIDED WITH CORRECTING FUNCTION FOR TREMBLING OF FOCUSED IMAGE

(75) Inventors: Ken Hirunuma, Tokyo; Shinji Tsukamoto, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,687

(22) Filed: Oct. 27, 1999

(30) Foreign Application Priority Data

Oct. 28, 1998 (JP) .................................................. 10-306708

(51) Int. Cl.$^7$ ............................ G02B 27/64; G02B 23/00
(52) U.S. Cl. .......................... 359/557; 359/407; 359/554
(58) Field of Search ..................................... 359/554–557, 359/694–706, 813, 814, 823, 829; 396/52–55; 348/208

(56) References Cited

U.S. PATENT DOCUMENTS

| | | | |
|---|---|---|---|
| 5,153,633 | * 10/1992 | Otani | 396/55 |
| 5,541,693 | 7/1996 | Enomoto | 396/55 |
| 5,583,597 | 12/1996 | Enomoto | 396/55 |
| 5,721,969 | * 2/1998 | Arai | 396/55 |
| 5,768,016 | * 6/1998 | Kanbara | 359/557 |
| 5,883,742 | * 3/1999 | Kamata | 359/554 |
| 5,917,653 | 6/1999 | Taniguchi | 359/557 |
| 5,959,769 | * 9/1999 | Yoneyama | 359/407 |
| 6,038,072 | * 3/2000 | Hirunuma et al. | 359/557 |

* cited by examiner

Primary Examiner—Thong Nguyen
(74) Attorney, Agent, or Firm—Greenblum & Bernstein, P.L.C.

(57) ABSTRACT

In binoculars, a lens supporting frame which supports correction lenses, comprises a lengthwise-direction and a lateral-direction driving frames. A bar is formed on a frame mounted on an inner wall of the binoculars, being positioned approximately close to a center of the lens supporting frame. Guide holes are formed in the bar. Each guide hole is respectively positioned at a portion corresponding to an upper and a lower edge portions of the lengthwise-direction driving frame. Guide pins are respectively mounted on a center portion of the upper and the lower edge portions so as to pierce the guide holes, projecting to a side of objective lenses. When the lens supporting frame is driven in the lengthwise direction, a lengthwise-direction driving actuator pushes one of the guide pins, the lengthwise-direction driving frame being led by the guide pins in the lengthwise direction.

10 Claims, 6 Drawing Sheets

OPTICAL DEVICE PROVIDED WITH CORRECTING FUNCTION FOR TREMBLING OF FOCUSED IMAGE

BACKGROUND OF THE INVENTION

1. Field of the Invention

The present invention relates to an optical device, for example, a pair of binoculars, which is provided with a correcting function for trembling of a focused image.

2. Description of the Related Art

Conventionally, there is known an optical device, such as a pair of binoculars, which is provided with a correcting function for trembling of a focused image. For example, an image tremble correcting mechanism is disclosed in U.S. Pat. No. 5,917,653. In the image tremble correcting mechanism, correcting optical. systems are driven two-dimensionally on a plane perpendicular to optical axes of the correcting optical systems.

Such an image tremble correcting mechanism is provided with a frame holding the correcting optical systems. A portion of this frame, at which a driving force is added, and a leading member which leads the frame in a predetermined direction on the plans, are spaced. Namely, a distance between the portion of the frame and the leading member is large. Accordingly, a moment of force, the rotational axis of which is the portion at which the driving force is added, is generated, when the frame is driven. Accordingly, the driving amount of the frame corresponding to the added driving force can not be determined. Namely, the driving of the correcting optical systems is unable to be accurately controlled.

Further, each time the frame is driven, unexpected forces are added to each member of the correcting mechanism, due to the aforementioned moment of force. Accordingly, the frame can not be driven smoothly, and portions of each member, which come into contact with other members due to the unexpected forces, are worn away.

SUMMARY OF THE INVENTION

Therefore, an object of the present invention is to provide an optical device which is provided with a correcting mechanism for trembling of a focused image, by which a correcting optical system is driven smoothly and accurately.

In accordance with an aspect of the present invention, there is provided an optical device with a correcting function for trembling of a focused image comprising: a holder that holds a correcting optical system for correcting a tremble of an optical axis of the optical device; a first driving mechanism that drives the holder along a first axis parallel to a direction of gravity, on a plane perpendicular to an optical axis of the correcting optical system; a second driving mechanism that drives the holder along a second axis perpendicular to the first axis, on the perpendicular plane; and a guide mechanism that leads the holder along the first axis when the holder is driven by the first driving mechanism. The first driving mechanism and the guide mechanism are positioned close to a center of gravity of the holder.

The first driving mechanism and the guide mechanism are disposed close to a position which is offset in a direction along the optical axis of the correcting optical system from a center point of the holder in a direction parallel to in the first axis.

The correcting optical system comprises a pair of correction lens elements. The holder comprises: a first driving frame that is supported by a fixed frame mounted on an inner wall of the optical device and has an opening portion; and a second driving frame that is slidably supported in the opening portion and holds the pair of correction lens elements. The first driving frame is driven by the first driving mechanism; and the second driving frame is driven by the second driving mechanism. The first driving mechanism and the guide mechanism are disposed on a line perpendicular to a plane which contains each center of the pair of correction lens elements and is perpendicular to optical axes of the pair of correction lens elements. The line is between the pair of correction lens elements.

The guide mechanism comprises: a first projecting member that is formed on a first edge portion of the first driving frame; a second projecting member that is formed on a second edge portion of the first driving frame; and a bar that is unitarily formed on the fixed frame and parallel to the first axis. The first edge portion is parallel to the second axis and positioned on an upper side of the optical device when the optical device is held in a standard position. The second edge portion is parallel to the second axis and positioned on a lower side of the optical device when the optical device is held in the standard position. The bar has a first guide hole and a second guide hole. The first projecting member pierces the first guide hole, being movable along the first axis, and the second projecting member pierces the second guide hole, being movable along the first axis.

The optical device further comprises: a first urging member that urges the first driving frame in a direction parallel to the second axis such that the first projecting member is held in contact with an inner wall, parallel to the first axis of the, first guide hole, at all times; and a second urging member that urges the first driving frame in the direction parallel to the second axis such that the second projecting member is held in contact with an inner wall, parallel to the first axis of the second guide hole, at all times.

The optical device further comprises a third urging member that urges the first driving frame along the first axis from the lower side to the upper side. The first driving mechanism can push the second projecting member against urging force of the third urging member, whereby the first driving frame is driven along the first axis from the upper side to the lower side.

The second projecting member includes a tip end that comprises a plane outer surface and a cylindrical outer surface. The second projecting member is situated such that the plane outer surface faces the upper side and the cylindrical outer surface faces the lower side.

The first driving mechanism:is a direct-drive-type actuator that comprises a motor and a shaft extending and retracting along the first axis in accordance with a rotational movement of the motor. A tip of the shaft abuts against the plane outer surface at all times.

The first driving frame is supported by the inner wall in such a manner that both side edge portions parallel to the first axis of the first driving frame are slidably supported by slots formed in the inner wall, enabling the first driving frame to move in a direction along the optical axis.

The first driving frame is rectangular, and the first axis is parallel to a longitudinal direction of the first driving frame.

The first axis is parallel to a vertical direction when this optical device is normally held.

In accordance with another aspect of the present invention, there is provided an optical device with a correcting function for trembling of a focused image comprising: a holder that holds a correcting optical system for correcting a tremble of an optical axis of the optical device;

a first driving mechanism that drives the holder along a first axis perpendicular to a longitudinal direction of the holder; a second driving mechanism that drives the holder along a second axis perpendicular to the first axis, on a plane perpendicular to an optical axis of the correcting optical system; and a guide mechanism that leads the holder along the first axis when the holder is driven by the first driving mechanism. The first driving mechanism and the guide mechanism are positioned close to a center of gravity of the holder.

DESCRIPTION OF THE PREFERRED EMBODIMENTS

Figure 1:
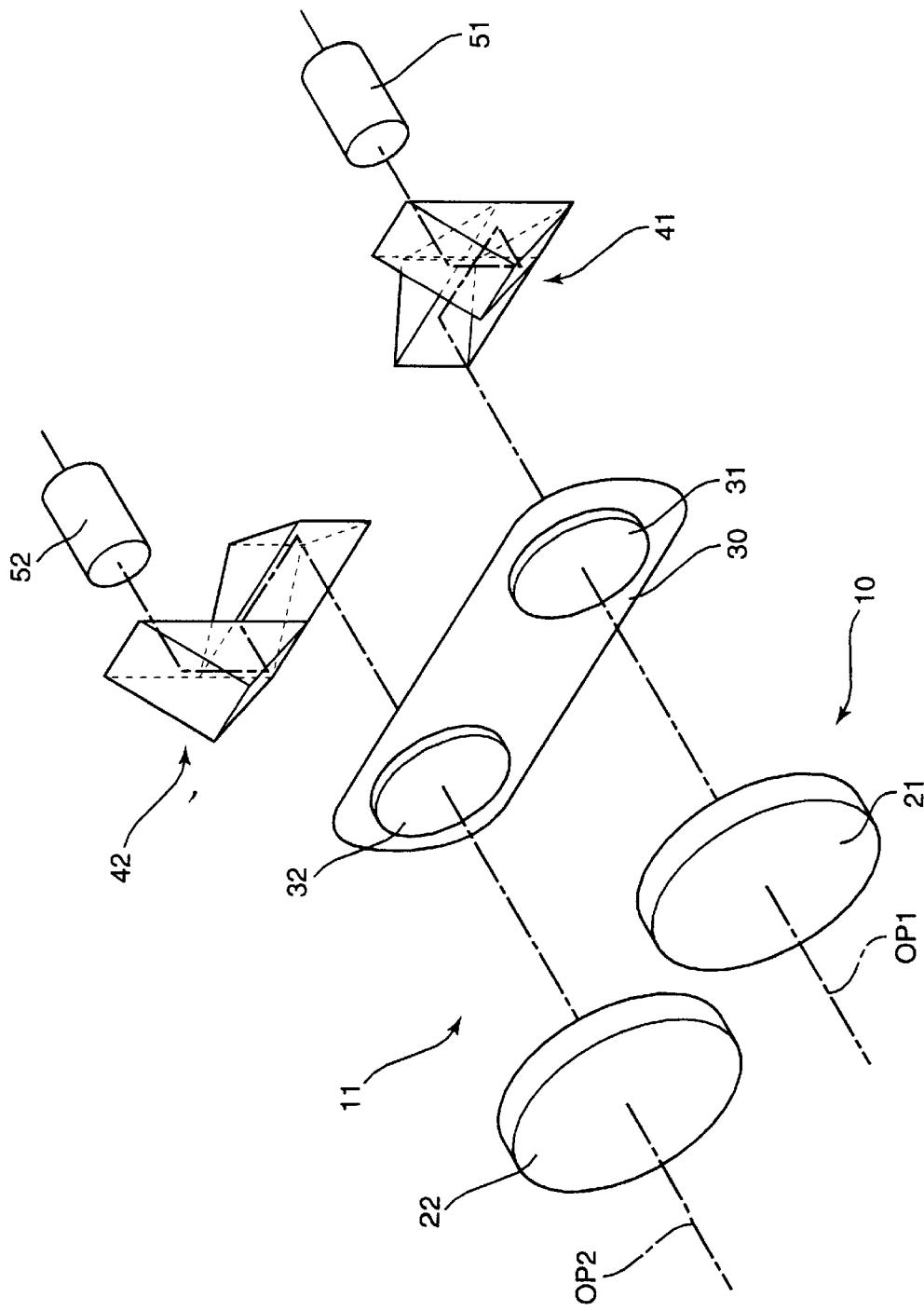
FIG. 1 is a conceptional view showing positional relationships between optical systems of binoculars to which an embodiment according to the present invention is applied.

The present invention will now be described with reference to embodiments shown in the drawings.

FIG. 1 is a conceptional view showing positional relationships between optical systems of binoculars to which a first embodiment, according to the present invention, is applied. In a first optical system 10, after passing through a first objective lens 21 and a first correction lens 31, reflected light from an object (not shown) is directed to a first eyepiece 51 through a first erecting prism 41. In a second optical system 11, after passing through a second objective lens 22 and a second correction lens 32, the reflected light is directed to a second eyepiece 52 through a second erecting prism 42.

The first and second correction lenses 31 and 32 are unitarily supported by a lens supporting frame 30. The relational position between each element of the first and second optical systems 10 and 11 is adjusted, such that an optical axis OP1 of the first optical system 10 and an optical axis OP2 of the second optical system 11 are aligned in parallel.

Note that, in this specification, a "lateral direction" means a direction parallel to a standard plane on which the optical axes OP1 and OP2 lie, being perpendicular to the optical axes OP1 and OP2, and a "lengthwise direction" means a direction perpendicular to the standard plane. Namely, while thee binoculars are held in a standard position, the lateral direction corresponds to a horizontal direction and the lengthwise-direction corresponds to a vertical direction.

Figure 2:
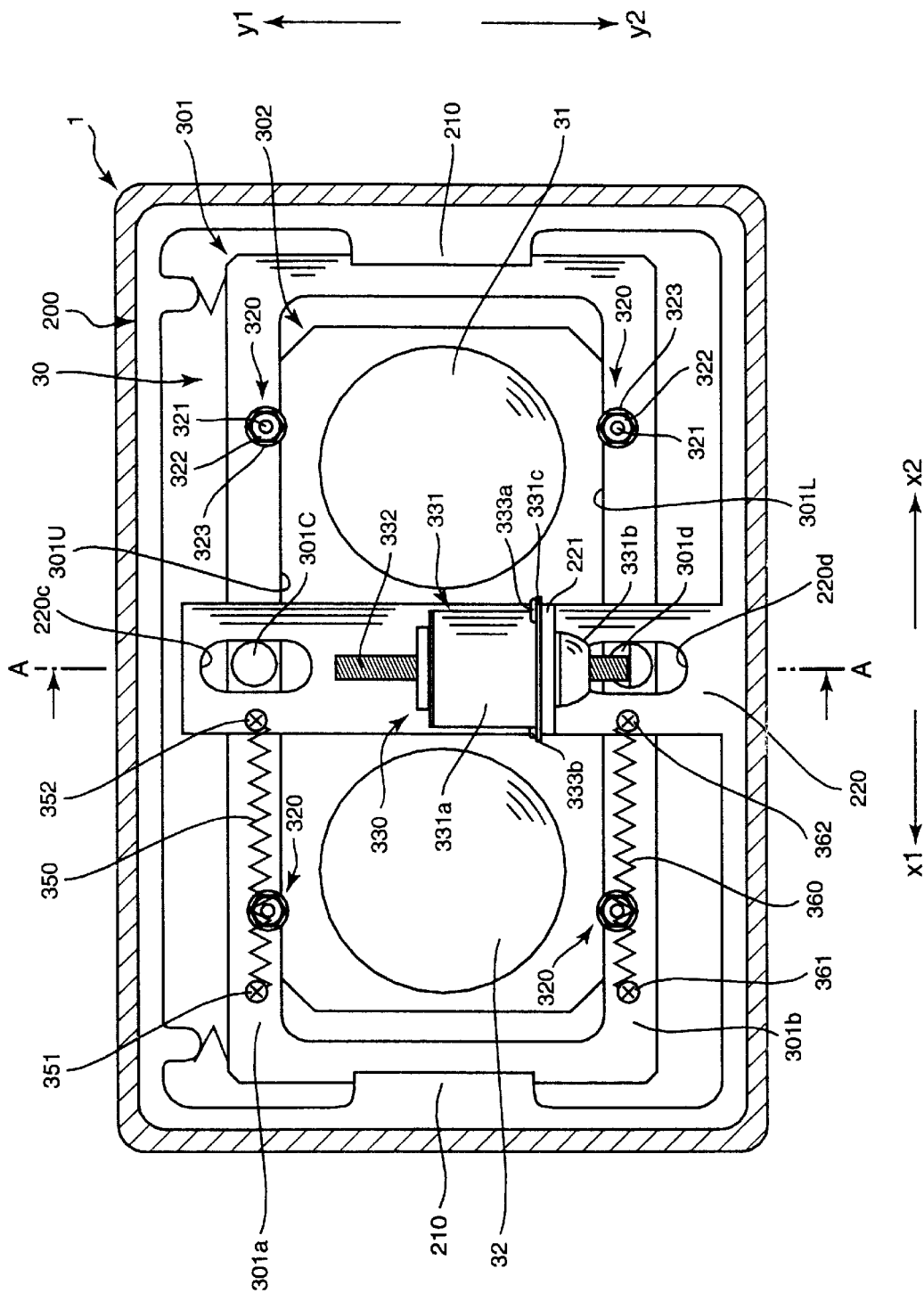
FIG. 2 is a front view of a lens supporting frame of the embodiment, viewed from a side of objective lenses.
Figure 3:
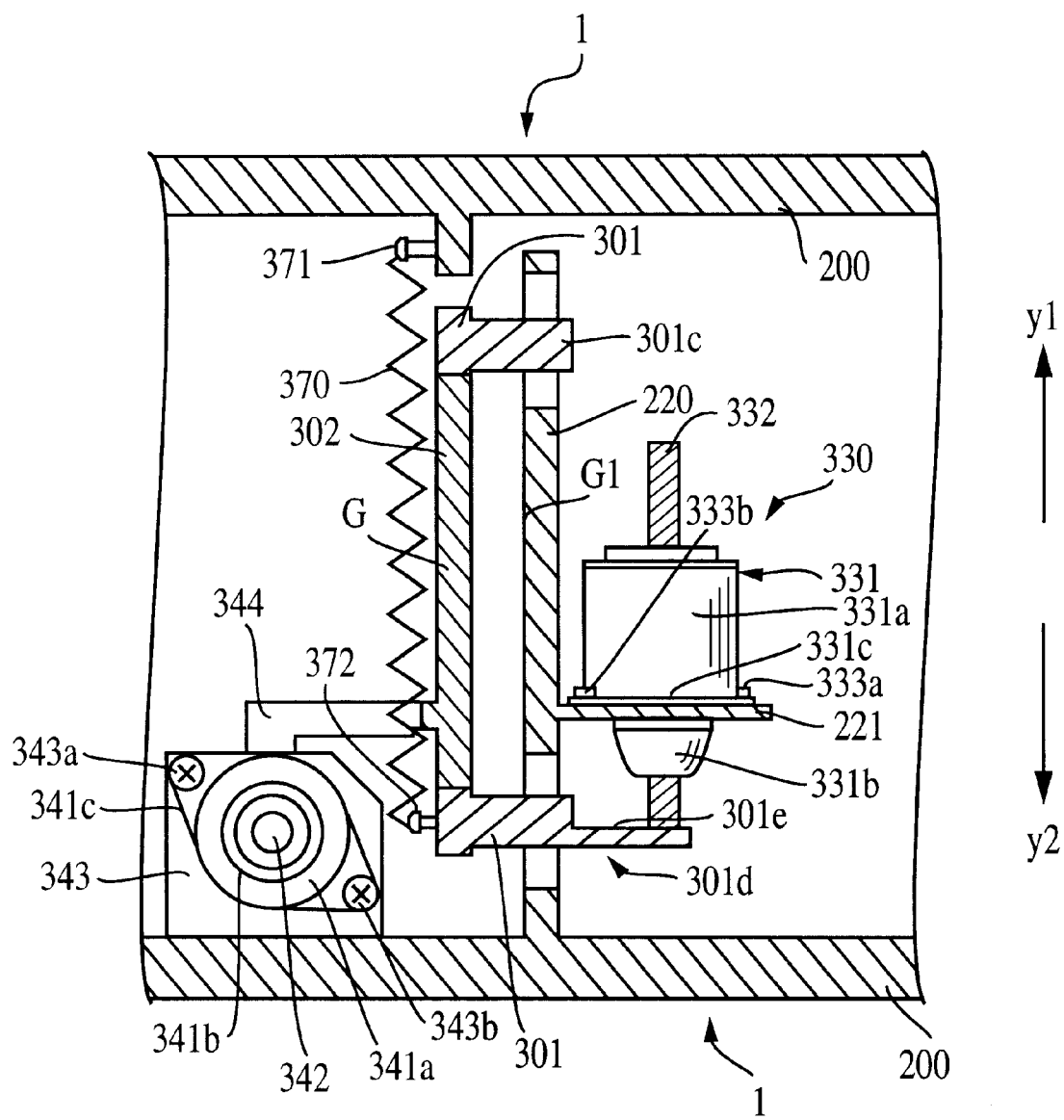
FIG. 3 is a sectional side view of the lens supporting frame of FIG. 2.

FIG. 2 is a front view of the lens supporting frame 30, viewed from the side of the first and second objective lenses 21, 22. FIG. 3 is a sectional view taken in the direction of the arrows substantially along the line A—A of FIG. 2. Note that, in FIG. 3, actuators (described below) are not sectionally depicted for clarity. The lens supporting frame 30 includes a lengthwise-direction driving frame 301 and a lateral-direction driving frame 302. The lengthwise-direction driving frame 301 is a flat board, being approximately rectangular. A through-hole opening is formed in the center of the driving frame 301. Namely, the driving frame 301 is a doughnut-shaped board. In the through-hole opening, an inner wall 301L and an inner wall 301U are parallel.

The driving frame 302 is a flat and approximately rectangular board. The driving frame 302 is disposed in the through-hole opening of the driving frame 301, unitarily holding the correction lenses 31 and 32 which are identical with respect to weight and shape. The thickness of the frame 302 in a direction parallel to optical axes of the correction lenses 31, 32 is identical at every portion.

A fixing frame 200 is unitarily formed on an inner wall 1 of the body of the binoculars. A bar 220, a longitudinal direction of which is parallel to the lengthwise direction, is formed on the fixing frame 200. The bar 220 is positioned at a portion of the fixing frame 200 corresponding to an approximate center portion of the lens supporting frame 30, between the correction lenses 31, 32. Namely, the bar 220 is disposed close to a position which is offset in a direction along the optical axes of the correction lenses 31, 32 from a center point of the lens supporting frame 30.

A guide hole 220c is formed at one end portion of the bar 220 corresponding to an upper edge portion 301a of the frame 301. The upper edge portion 301a is parallel to the lateral direction, being situated on an upper side when the binoculars are held in the standard position. A guide hole 220d is formed at another end portion of the bar 220 corresponding to a lower edge portion 301b of the frame 301. The lower edge portion 301b is parallel to the lateral direction, being situated on a lower side when the binoculars are held in the standard position. A pedestal 221 is unitarily formed on a plane of the bar 220, which faces to the side of the objective lenses 21, 22. The pedestal 221 is positioned between the guide holes 220c and 220d.

A guide pin 301c and a guide pin 301d are respectively mounted on the upper edge portion 301a and the lower edge portion 301b. The guide pin 301c is disposed at an approximate center portion of the upper edge portion 301a in the lateral direction. Similarly, the guide pin 301d is disposed at an approximate center portion of the lower edge portion 301b in the lateral direction. The guide pins 301c and 301d are cylindrically shaped.

The outer diameter of the guide pin 301c is slightly smaller than the width of the guide hole 220c in the lateral direction, and the outer diameter of the guide pin 301d is slightly smaller than the width of the guide hole 220d in the lateral direction. Accordingly, the guide pins 301c and 301d respectively pierce the guide holes 220c and 220d, being slidable in the lengthwise direction.

A sectional figure of a tip of the guide pin 301d, cut along a plane perpendicular to the optical axes of the correction lenses 31, 32, has a half-moon-shaped figure. The guide pin 301d projects to the side of the objective lenses 21, 22, in such a manner that a plane surface 301e is parallel to the lateral direction and faces in a direction y1.

A lengthwise-direction actuator, generally indicated by reference 330, comprises a stepping motor 331 and a shaft 332. The stepping motor 331 comprises a motor case 331a and a motor 331b which is mounted in the motor case 331a. The motor 331b can rotate in forward and reverse directions around a lengthwise direction axis. The motor case 331a is fixed at the pedestal 221. The motor 331b pierces a hole (omitted in FIGS. 2 and 3) formed in the pedestal 221, projecting in a direction y2. The shaft 332 is supported so as to be unitarily rotatable with the rotational movement of the motor 331b and movable along the longitudinal axis thereof.

A thread is formed on the outer surface of the shaft 332, and the shaft 332 is engaged with a female thread (omitted in FIGS. 2 and 3) formed on the inner surface of a quill of the motor case 331a. Namely, the shaft 332 rotatably extends or retracts in the longitudinal direction, in accordance with the rotational direction, forward and reverse, of the motor 331b. A ball is mounted on the tip of the shaft 332. The ball of the shaft 332 abuts the plane surface 301e of the guide pin 301d.

A coil spring 350 is mounted on the upper edge portion 301a, at the side of the correction lens 32. Both ends of the coil spring 350 are respectively hook-shaped. One end is engagedly hooked on a screw 351 which is engaged with a portion of the upper edge portion 301a close to an upper corner thereof, at the side of the second correction lens 32. Another end is engagedly hooked on a screw 352 which is engaged with a portion of the bar 220 close to the guide hole 220c.

Similarly, a coil spring 360 is mounted on the lower end portion 301b, at the side of the correction lens 32. Both ends of the coil spring 360 are respectively hook-shaped. One end is engagedly hooked on a screw 361 which is engaged with a portion of the lower end portion 301b close to a lower corner thereof, at the side of the second correction lens 32. Another end is engagedly hooked on a screw 362 which is engaged with a portion of the bar 220 close to the guide hole 220d.

Namely, the coil springs 350, 360 urge the lengthwise-direction driving frame 301 in a direction x2 at all times. Accordingly, the guide pin 301c is in contact with an inner wall of the guide hole 220c, of the side of the correction lens 31, at all times, and the guide pin 301d is in contact with an inner wall of the guide hole 220d, of the side of the correction lens 31, at all times.

Each of the guide pins 301c and 301d are to a large extent lighter and smaller than the frames 301, 302. Accordingly, a center of gravity G (see FIG. 3) of the lens supporting frame 30 is positioned at a center of the width of the frame 302, in a direction parallel to the optical axes of the correction lenses 31, 32. A point G1 is an intersecting point of a straight line parallel to the optical axes of the correction lenses 31, 32, on which the center of gravity G lies, and a surface of the bar 220, facing the frame 302. The point G1 is positioned on an approximate center point of a straight line connecting a contacting point of the guide pin 301c and the guide hole 220c, and a contacting point of the guide pin 301d and the guide hole 220d.

Namely, with respect to the direction parallel to the optical axes of the correction lenses 31, 32, the center of gravity G is positioned at the center of the width of the frame 302; with respect to the lateral direction, the center of gravity G is positioned close to the center of the supporting frame 30; and with respect to the lengthwise direction, the center of gravity G is positioned on an approximate center point of a straight line connecting a contacting point of the guide pin 301c and the guide hole 220c, and a contacting point of the guide pin 301d and the guide hole 220d.

Further, in FIG. 3, a clearance between the bar 220 and the frames 301, 302 is depicted so as to be relatively large, for making a positional relationship between the frames 301, 302 and the bar 220 understandable. However, a practical clearance between the bar 220 and the frames 301, 302 is much smaller than depicted. As shown in FIG. 3, the lens supporting frame 30 is a board, so that a practical distance between the center of gravity G and the point G1 is much shorter than depicted. Namely, the bar 220, of a leading member, is situated closest to the center of gravity G, and approximate to a center of the lens supporting frame 30 (see FIG. 2).

The guide holes 220c and 220d are identical, with respect to shape and measurement. The guide holes 220c and 220d are positioned symetrically about a straight line parallel to the lateral direction, on which the point G1 lies. In other words, a distance parallel to the lengthwise direction, between the straight line and the center of the guide hole 220c in the lengthwise direction, equals a distance parallel to the lengthwise direction, between the straight line and the center of the guide hole 220d in the lengthwise direction. While utilizing the binoculars, when the guide pin 301c is positioned at a center of the guide hole 220c in the lengthwise direction and the guide pin 301d is positioned at a center of the guide hole 220d in the lengthwise direction, the optical axes of the correction lenses 31, 32 are respectively coaxial with the optical axes OP1, OP2 of the other optical systems.

Figure 4:
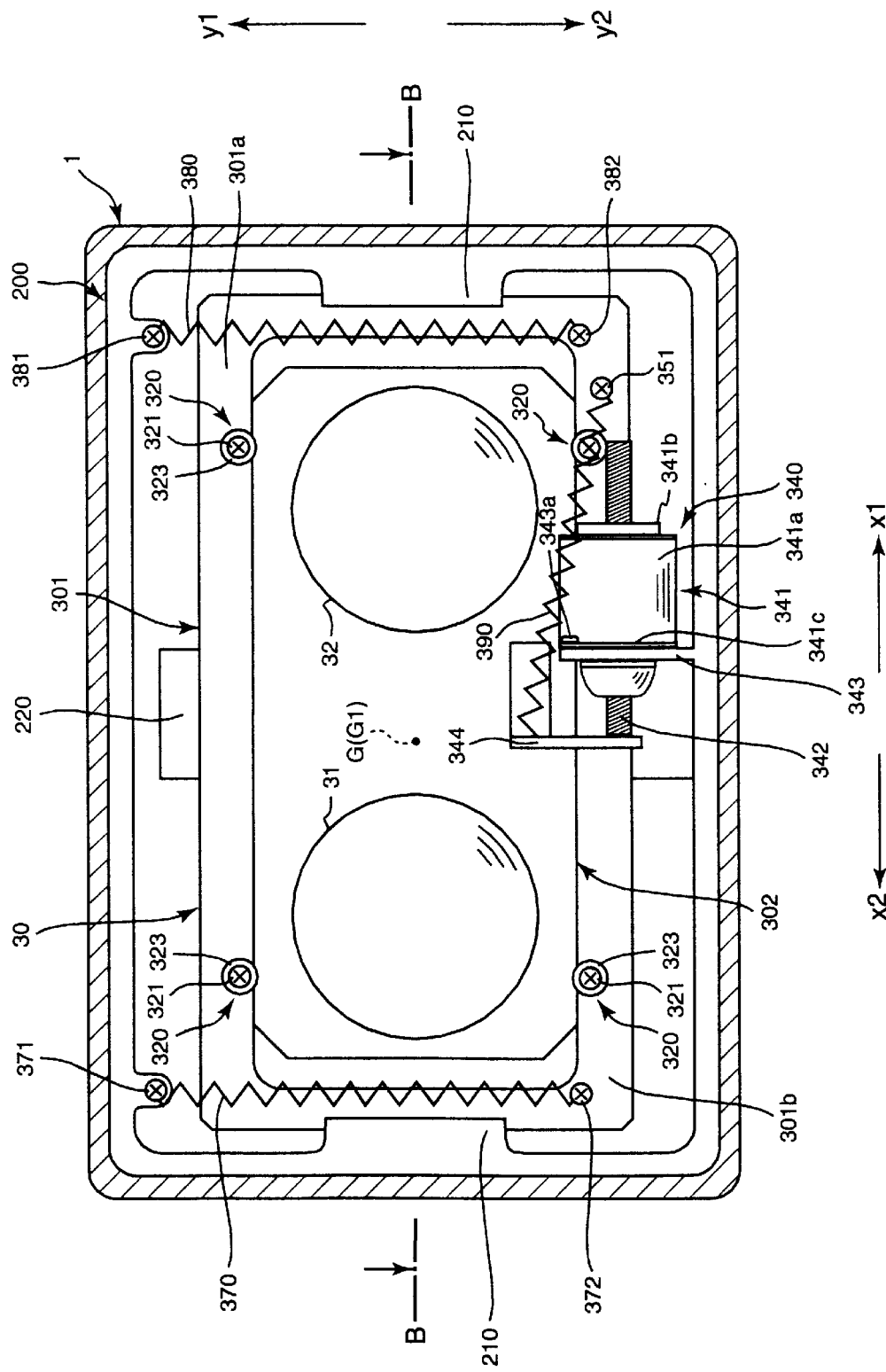
FIG. 4 is a front view of the lens supporting frame of the embodiment, viewed from a side of eyepieces.
Figure 5:
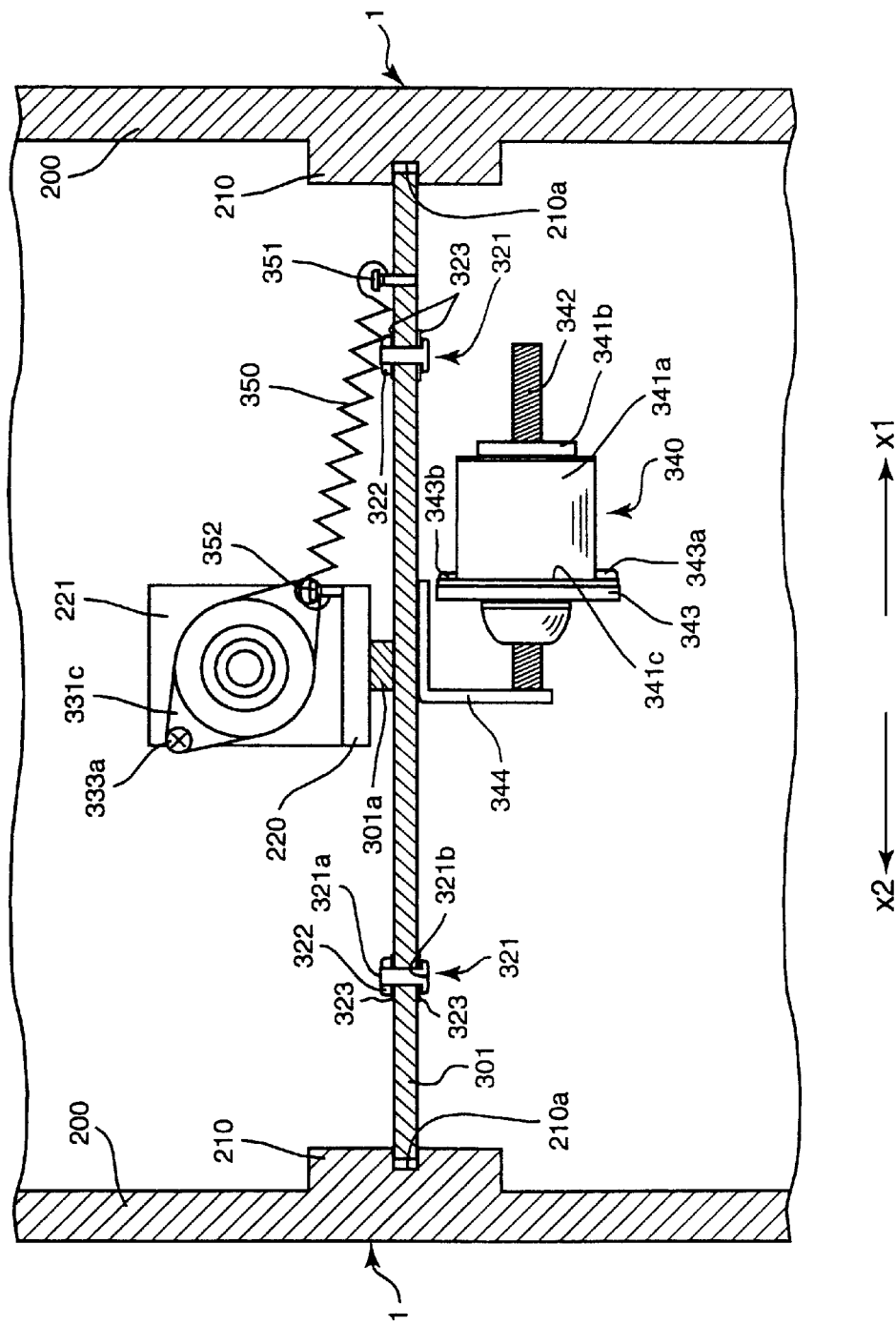
FIG. 5 is a sectional plan view showing the lens supporting frame of FIG. 4.

FIG. 4 is a front view of the lens supporting frame 30, viewed from the side of the first and second eyepieces 51, 52. FIG. 5 is a sectional view taken in the direction of the arrows substantially along the line B—B of FIG. 4. Note that, in FIG. 5, the lengthwise-direction actuators 330 and some other members are not sectionally depicted for clarity. A coil spring 370 is mounted on aside edge portion of the lengthwise-direction driving frame 301, close to the first correction lens 31. Both ends of the coil spring 370 are respectively hook-shaped. The both ends are respectively engagedly hooked on a screw 371 and a screw 372. The screw 371 is engaged with an upper portion of the fixing frame 200 close to the correction lens 31, and the screw 372 is engaged with a corner of the frame 301, defined by the lower edge portion 301b and the side edge portion of the frame 301 close to the correction lens 31.

Similarly, a coil spring 380 is mounted on a side edge portion of the frame 301, close to the second correction lens 32. Both ends of the coil spring 380 are respectively hook-shaped. The both ends are respectively engagedly hooked on a screw 381 and a screw 382. The screw 381 is engaged with an upper portion of the fixing frame 200 close to the correction lens 32, and the screw 382 is engaged with a corner of the frame 301, defined by the lower edge portion 301b and the side edge portion of the frame 301 close to the correction lens 32.

Namely, the coil springs 370 and 380 urge the lengthwise-direction driving frame 301 in the direction y1. Accordingly, the tip end of the shaft 332 of the actuator 330 abuts against the plane surface 303e of the guide pin 301d at all times (see FIG. 3).

A lateral-direction actuator, generally indicated by reference 340, is placed at a portion close to the lower side of the driving frames 301 and 302, on the side of the first and second eyepieces 51 and 52 (see FIG. 1), being also disposed on a side of the second correction lens 32 viewed from a center axis of the frames 301 and 302 along the lengthwise direction. The lateral-direction actuator 340 comprises a stepping motor 341 and a shaft 342. The stepping motor 341 comprises a motor case 341a and a motor 341b, which is mounted in the motor case 341a.

The motor 341b, can rotate in forward and reverse directions around a lateral direction axis. The shaft 342 is supported so as to be unitarily rotatable with the rotational movement of the motor 341b, and movable along the longitudinal axis thereof. A thread is formed on the outer surface of the shaft 342, and the shaft 342 is engaged with a female thread (omitted in FIGS. 2 and 4) formed on the inner surface of a quill of the motor case 341a. Namely, the shaft 342 rotatably extends or retracts in the longitudinal direction, in accordance with the rotational direction, forward and reverse, of the motor 341b. A ball is mounted on the tip of the shaft 342. The ball of the shaft 342 abuts a second pressed member 344 fixed at the lower portion of the lateral-direction driving frame 302.

A coil spring 390 is disposed close to the lower edge portion 301b of the frame 301, on a side of the first and second eyepieces 51 and 52 (see FIG. 4). Both ends of the coil spring 390 are respectively hook-shaped. One end is engagedly hooked on a screw 351 which is engaged with a portion close to the corner of the frame 301 defined by the lower edge portion 301b and a side edge portion of the frame 301 close to the correction lens 32. Another end is hooked in a hole in a pressed board 344 which is fixed at a central portion of the frame 302, at the lower side thereof. Namely, the coil spring 390 urges the frame 302 in the direction x1. Accordingly, the ball of the shaft 342 abuts the pressed board 344 at all times.

As shown in FIG. 4, the surface of the pressed board 344, which the ball of the shaft 342 abuts, accords with a plane, perpendicular to the standard plane, on which the center of the gravity G lies. With respect to the driving of the frame 302 in the lateral direction, a position, to which the driving force of the lateral-direction actuator 340 is added, is as close as possible to the center of the gravity G.

As shown in FIG. 3, a flange 341c, generally lozenge-shaped, is unitarily formed at one end of the motor case 341a of the stepping motor 341. The flange 341c is hold on a fixing board 343 by a screw 343a and a screw 343b which is placed at the opposite side to the screw 343a with the motor case 341a therebetween. The fixing board 343 is unitarily formed on the fixing frame 200. Namely, the motor case 341a is fixed to the fixing frame 200 through the flange 341c and the fixing board 343.

As shown in FIG. 5, a flange 331c, generally lozenge-shaped, is unitarily formed at one end of the motor case 331a of the stepping motor 331. The flange 331c is held on the pedestal 221 of the bar 220 by a screw 333a and a screw 333b (see FIGS. 3), which is placed at the opposite side to the screw 333a with respect to the motor case 331a. Namely, the motor case 331a is fixed to the bar 220 through the flange 331c and the pedestal 221.

As shown in FIGS. 2, 4 and 5, each of holding members 320 respectively comprises a screw 321, a nut 322 and a pair of washers 323. A thread is formed on the shaft 321a. The shaft 321a is received by a hole (omitted in FIGS. 2, 4 and 5) formed in the frame 301, piercing the hole. The nut 322 is threadingly engaged on a free end of the shaft 321a, opposite a head 321b of the screw 321. One washer 323 is mounted between the head 321b and the driving frame 301, and another washer 323 is mounted between the nut 322 and the driving frame 301.

The pair of washers 323 are respectively disposed on planes that include both side surfaces of the driving frame 301 and are perpendicular to the optical axes OP1 and OP2. Each washer 323 is disposed close to the driving frame 302, in such a manner that one portion of each washer 323 overlaps the driving frame 302. Namely, a perimeter portion of the driving frame 302 is lightly clamped by the pair of washers 323, so that the frame 302 is partially interposed between the pair of washers 323. Accordingly, movement of the driving frame 302 parallel to the optical axes OP1 and OP2 is restrained, being led in the lateral direction when driven.

Projecting portions 210 are formed on inner walls of the fixing frame 200, which are respectively parallel to the lengthwise direction. The projecting portions 210 project in the lateral direction. A slot 210a is formed in each projecting portion 210 so as to be parallel to the lengthwise direction. Both side end portions of the lengthwise-direction driving frame 301 are respectively engaged with the slot 210a of each projecting portion 210, being slidable in the lengthwise direction. Accordingly, movement of the driving frame 301 parallel to the optical axes OP1 and OP2 is restrained, being led in the lengthwise direction when driven.

Further, as apparent from FIGS. 2, 3 and 4, the correction lenses 31 and 32 are positioned symmetrically about a straight line, parallel to the lengthwise direction, on which the center of gravity G lies, and also the holding members 320 on the side of the correction lens 31 and the holding members 320 on the side of the correction lens 32 are positioned symmetrically about the line. Accordingly, a center of gravity of a movable portion which is provided with the driving frames 301, 302, the correction lenses 31, 32 and the holding members 320, accords with the center of the gravity G.

Figure 6:
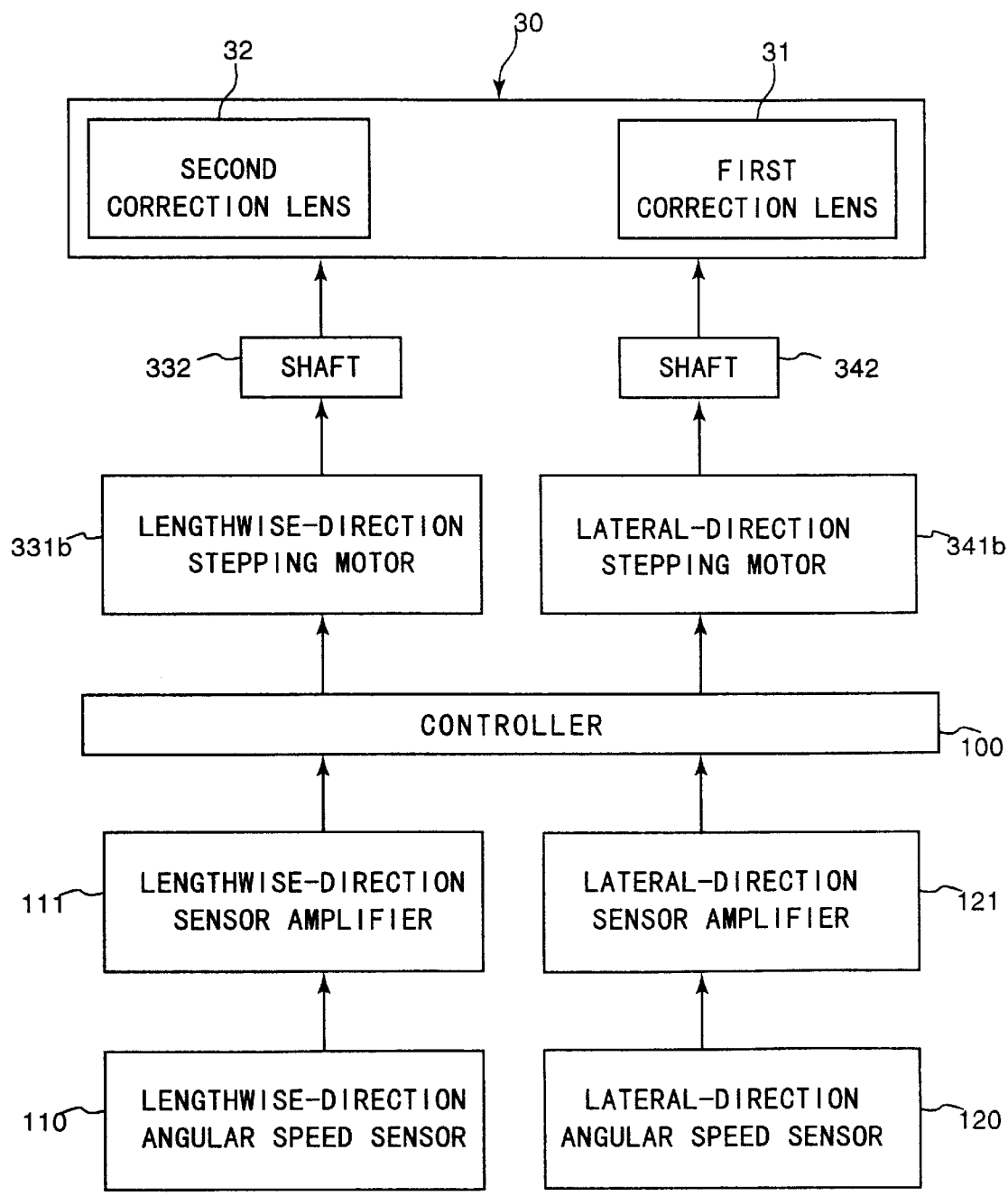
FIG. 6 is a block diagram of a correction mechanism for trembling of focused image of the embodiment.

FIG. 6 is a block diagram of the tremble correcting device of this embodiment. A lengthwise-direction angular speed sensor 110 detects a vector and an angular speed of a trembling in the lengthwise direction, and a lateral-direction angular speed sensor 120 detects a vector and an angular speed of a trembling in the lateral direction, while the binoculars are being held by a user.

A lengthwise-direction sensor amplifier 111 is connected to the angular speed sensor 110, amplifying the lengthwise-direction angular speed outputted from the angular speed sensor 110. The amplified lengthwise-direction angular speed, outputted from the sensor amplifier 111, is inputted to a controller 100. The controller 100 is, for example, a micro computer. Similarly, a lateral-direction sensor amplifier 121 is connected to the angular speed sensor 120, amplifying the lateral-direction angular speed outputted from the angular speed sensor 120. The amplified lateral-direction angular speed outputted from the sensor amplifier 121 is inputted to the controller 100.

In the controller 100, the lengthwise-direction angular speed and the lateral-direction angular speed are respectively converted to digital values, based on a predetermined synchronous signal. Each digital value is subjected to integration, so that a lengthwise-direction angular displacement signal and a lateral-direction angular displacement signal, respectively corresponding to an amount of hand trembling in each of the directions, are calculated. Based on the lengthwise-direction angular displacement signal, a lengthwise-direction driving amount of the lens supporting frame 30 in a plane perpendicular to the optical axes OP1 and OP2, i.e. a driving step number of the motor 331b of the lengthwise-direction actuator 330 (pulse number inputted to the motor 331b), is calculated. Similarly, based on the lateral-direction angular displacement signal, a lateral-direction driving amount of the lens supporting frame 30 in a plane, i.e. a driving step number of the motor 341b of the lateral-direction actuator 340, is calculated.

The motor 331b of the lengthwise-direction actuator 330 is rotated based on the pulse number outputted from the controller 100. The rotational motion of the motor 331b is transmitted to the lens supporting frame 30 through the shaft 332, so that the lens supporting frame 30 is moved in the lengthwise-direction.

In order to drive the lens supporting frame 30 in the direction y2, a control signal is outputted from the controller 100, whereby the motor 331b is rotated in the forward direction by a predetermined amount. In accordance with the rotation of the motor 331b in the forward direction, the shaft 332 extends in the direction y2, so that the frame 301 is moved in the direction y2 against the urging force of the coil springs 370 and 380. In order to drive the lens supporting frame 30 in the direction y1, a control signal is outputted from the controller 100, whereby the motor 331b is rotated in the reverse direction by a predetermined amount. In accordance with the rotation of the motor 331b in the reverse direction, the shaft 332 retracts in the direction y1, so that the frame 301 is moved in the direction y1 by the urging force of the coil springs 370 and 380.

Similarly, the motor 341b of the lateral-direction actuator 340 is rotated based on the pulse number outputted from the controller 100. The rotational motion of the motor 341b, is transmitted to the lens supporting frame 30 through the shaft 342, so that the lens supporting frame 30 is moved in the lateral-direction.

In order to drive the lens supporting frame 30 in the direction x2, a control signal is outputted from the controller 100, whereby the motor 341b, is rotated in the forward direction by a predetermined amount. In accordance with the rotation of the motor 341b, in the forward direction, the shaft 342 extends in the direction x2, so that the frame 302 is moved in the direction x2 against the urging force of the coil spring 390. In order to drive the lens supporting frame 30 in the direction x1, a control signal is outputted from the controller 100, whereby the motor 341b is rotated in the reverse direction by a predetermined amount. In accordance with the rotation of the motor 341b, in the reverse direction, the shaft 342 retracts in the direction x1, so that the frame 302 is moved in the direction x1 by the urging force of the coil spring 390.

As described above, according to this embodiment, the lengthwise-direction actuator 330, the guide pins 301c, 301d, and the guide holes 220c, 220d, are placed close to a position which is offset in a direction along the optical axes of the correction lenses 31, 32 from a center point of the lengthwise-direction driving frame 301 in the longitudinal direction thereof. Namely, the above members are disposed close to the center of gravity G of the frame 301. When the binoculars are held in the standard position, the lens supporting frame 30 is pulled by the gravity at all times. When the lens supporting frame 30 is driven in the lengthwise direction, a moment of force, rotational center of which is the abutting point between the tip of the shaft 332 and the plane surface 301e of the guide pin 301d, is not generated. Accordingly, the driving operation of the frame 301 in the lengthwise direction is evenly and smoothly performed.

Note that, it is desirable that the driving mechanism and the leading mechanism are positioned close to the center of the gravity G, with respect to both the lengthwise direction and the lateral direction. However, if such positioning is difficult, due to a design for example, it is preferable that the lengthwise-direction actuator 330 and the leading member 220 are positioned close to the center of the gravity G, as in this embodiment. Generally, the trembling in the lengthwise direction occurs more often than the trembling in the lateral direction. Accordingly, with respect to the lengthwise direction, a high accuracy of the correction of the trembling and a long life of the actuator and the leading member are obtained.

Further, according to this embodiment, the guide pin 301c is held in contact with the inner wall of the guide bole 220c of the bar 200 by the coil spring 350 at all times, and the guide pin 301d is held in contact with the inner wall of the guide hole 220d of the bar 220 by the coil spring 360 at all times. Accordingly, when the frame 301 is driven in the directions y1 and y2, the frame 301 is led stably in the lengthwise direction.

Furthermore, the guide pin 301d is utilized as a leading member, being a pressed member in the lengthwise-direction driving of the frame 301. Accordingly, a number of members in the binoculars is decreased, and an overall size of the binoculars becomes more compact.

As described above, according to the present invention, a correcting mechanism for trembling of focused image, by which correcting optical system is driven accurately and smoothly, can be obtained.

The present disclosure relates to subject matter contained in the following Japanese Patent Application No. 10-306708 (filed on Oct. 28, 1998), which is expressly incorporated herein, by reference, in its entirety.

What is claimed is:

1. An optical device with a correcting function for trembling of a focused image comprising:

a holder that holds a correcting optical system for correcting a tremble of an optical axis of said optical device, said correcting optical system comprising a pair of correction lens elements, and said holder comprising:
  a first driving frame that is supported by a fixed frame mounted on an inner wall of said optical device and defines an opening portion; and
  a second driving frame that is slidably supported in said opening portion and holds said pair of correction lens elements;
a first driving mechanism that drives said first driving frame of said holder along a first axis parallel to a direction of gravity, on a plane perpendicular to the optical axis of said optical device;
a second driving mechanism that drives said second driving frame of said holder along a second axis perpendicular to said first axis, on said perpendicular plane; and
a guide mechanism that leads said holder along said first axis when said holder is driven by said first diving mechanism;
wherein said first driving mechanism and said guide mechanism are positioned proximate to a center of gravity of said holder and proximate to a position offset, in a direction along said optical axis, from a center point of said holder; and
wherein said first driving mechanism and said guide mechanism are disposed on a line perpendicular to a plane containing a center of each of said pair of correction lens elements and being perpendicular to the optical axis of said optical device, said line being between said pair of correction lens elements.

2. The optical device of claim 1, said guide mechanism comprising:

a first projecting member that is formed on a first edge portion of said first driving frame, said first edge portion being parallel to said second axis and positioned on an upper side of said optical device when said optical device is held in a standard position;
a second projecting member that is formed on a second edge portion of said first driving frame, said second edge portion being parallel to said second axis and positioned on a lower side of said optical device when said optical device is held in the standard position; and a bar that is unitarily formed on said fixed frame and parallel to said first axis, said bar defining a first guide hole and a second guide hole;

wherein said first projecting member extends through said first guide hole, being movable along said first axis, and said second projecting member extends through said second guide hole, being movable along said first axis.

3. The optical device of claim 2, further comprising:

a first urging member that urges said first driving frame in a direction parallel to said second axis such that said first projecting member is held in contact at all times with an inner wall of said first guide hole that is parallel to said first axis; and a second urging member that urges said first driving frame in a direction parallel to said second axis such that said second projecting member is held in contact at all times with an inner wall of said first guide hole that is parallel to said first axis.

4. The optical device of claim 2, further comprising an urging member that urges said first driving frame along said first axis in a direction from said lower side to said upper side;

wherein said first driving mechanism drives said second projecting member in a direction opposite to the direction of the urging force of said urging member, whereby said first driving frame is driven along said first axis from said upper side to said lower side.

5. The optical device of claim 4, said second projecting member comprising a tip end, said tip end comprising a planar outer surface configured to face said upper side and a cylindrical outer surface configured to face said lower side.

6. The optical device of claim 5, said first driving mechanism being a direct-drive-type actuator comprising a motor and a shaft extendable and retractable along said first axis in accordance with a rotational movement of said motor, a tip of said shaft abutting said planar surface of said second projecting member at all times.

7. The optical device of claim 2, further comprising a pair of opposing slots, each of which is formed by a pair of projections from said inner wall parallel to said first axis, wherein the first edge portion and the second edge portion of said first driving frame are slidably supported by the opposing slots, enabling said first driving frame to move in a direction parallel to said first axis.

8. The optical device of claim 2, wherein said first driving frame is rectangular, and said first axis is parallel to a longitudinal direction of said first driving frame.

9. The optical device of claim 1, wherein said first axis is parallel to a vertical direction when said optical device is normally held.

10. An optical device with a correcting function for trembling of a focused image comprising:

a holder that holds a correcting optical system for correcting a tremble of an optical axis of said optical device, said correcting optical system comprising a pair of correction lens elements, and said holder comprising:

a planar member, with a horizontal dimension and a vertical dimension, positioned so that a plane of said holder is perpendicular to an optical axis of said correcting optical system;

a first driving frame that is supported by a fixed flame mounted on an inner wall of said optical device and defines an opening portion; and a second driving frame that is slidably supported in said opening portion and holds said pair of correction lens elements;

a first driving mechanism that drives said first driving frame of said holder along a first axis in the plane of the holder and perpendicular to the horizontal dimension of said holder;

a second driving mechanism that drives said first driving frame of said holder along a second axis in the plane of the holder and perpendicular to said first axis; and a guide mechanism that leads said holder along said first axis when said holder is driven by said first diving mechanism;

wherein said first driving mechanism and said guide mechanism are positioned proximate to a center of gravity of said holder and proximate to a position offset, in a direction along said optical axis, from a center point of said holder; and wherein said first driving mechanism and said guide mechanism are disposed on a line perpendicular to a plane containing a center of each of said pair of correction lens elements and being perpendicular to the optical axis of said optical device, said line being between said pair of correction lens elements.

* * * * *